United States Patent Office 3,402,026
Patented Sept. 17, 1968

3,402,026
PRECIPITATION OF PHOSPHORUS VALUES
FROM AQUEOUS MEDIA
Mayer B. Goren, Golden, Colo., assignor to Kerr-McGee
Corporation, a corporation of Delaware
No Drawing. Filed Apr. 13, 1965, Ser. No. 447,862
17 Claims. (Cl. 23—321)

ABSTRACT OF THE DISCLOSURE

Dissolved phosphorus values are precipitated from an acidic aqueous medium which has a pH value less than 2 and contains a gram atomic weight ratio of dissolved ferric iron to dissolved phosphorus greater than 1.75:1 by reducing sufficient ferric iron to lower the said ratio to between 0.75:1 and 1.5:1, and addition of sufficient base to raise the pH value to between 2 and 3. The precipitated phosphorus values are separated from the aqueous medium, thereby allowing vanadium values, when present in the aqueous medium, to be recovered with less phosphorus contamination. The invention is also useful in controlling phosphorus in the leaching of ores containing uranium and vanadium values.

---

This invention broadly relates to a novel process for the precipitation of phosphorus values from aqueous media which also contain a relatively high concentration of ferric ion. In some of its more specific aspects, the invention further relates to the leaching of uranium-vanadium ores and the recovery of vanadium values from aqueous media contaminated with iron and phosphorus values.

Uranium ores frequently contain uranium values in the tetravalent state as the silicate, phosphate, or carbon complex. The tetravalent uranium is not amenable to leaching with mineral acid and most mineral acid leaching processes involve the addition of an oxidizing agent. The oxidizing agent oxidizes the uranium to the hexavalent state and the oxidized uranium is easily solubilized by the mineral acid. The pH value of an aqueous mineral acid solution used in leaching uranium ore may be 0–0.5 initially in order to obtain solubilization of the uranium values at a satisfactory rate. However, as the leach proceeds the pH value gradually rises due to the neutralization of the acid by constituents of the ore and eventually it is substantially above 0.5. Additional mineral acid may be added to adjust the pH to a low value giving a satisfactory rate of leaching when this is desirable.

In the acid leaching of uranium-vanadium ores, usually aqueous sulfuric acid containing ferric ion as an oxidant is intimately contacted with the ore to thereby oxidize the uranium and solubilize both the uranium and vanadium values. The iron content of the leach liquor is usually in both the ferrous and ferric oxidation states. Only ferric ion can serve as an oxidant for the uranium values, and in so doing a portion of the ferric ion is reduced to ferrous ion during the leaching step. If vanadium values are present initially in the pentavalent oxidation state, they are also at least partially reduced to the tetravalent oxidation state. It is necessary to reoxidize the ferrous ion to ferric ion and/or the tetravalent vanadium values to the pentavalent oxidation state in order to have them function once again as oxidizing agents for the uranium values. The oxidation may be effected by addition of a chemical oxidant such as sodium chlorate or by microbiological oxidation.

The leach liquor containing uranium and vanadium values may be passed to a prior art solvent extraction process for the recovery of the uranium values. A typical resultant uranium-barren raffinate may contain less than 0.5 gram per liter of vanadium values when calculated as $V_2O_5$ and may contain 0.2–0.3 gram per liter or more of phosphorus values when calculated as $P_2O_5$. Thus, the $V_2O_5$ to $P_2O_5$ ratio is extremely low and phosphate contamination of a vanadium product prepared from the raffinate is a serious problem. A vanadium product of commerce must meet rigid phosphate specifications and the final vanadium product cannot be sold as a commercial product unless the specifications are met.

Vanadium values may be recovered from an aqueous solution containing about 0.5 gram per liter of $V_2O_5$. For example, if the solution is in a highly oxidized state, then heating of the solution to its boiling point at a pH of 2–2.5 causes a low-grade vanadium product to precipitate which assays approximately 20–25% $V_2O_5$. The recovery is high and often above 85%, but the phosphate rejection is not good. However, the heating of such large quantities of liquor from ambient temperature to the boiling point renders the process uneconomic due to the cost of supplying the large quantities of heat involved. Additionally, in instances where only reduced vanadium values are present, the vanadium values must be oxidized prior to heating the solution and this further increases the cost.

It is an object of the present invention to provide a novel process for precipitating phosphorus values from an aqueous medium which also contains relatively large amounts of ferric iron.

It is a further object to provide a novel process for recovering vanadium values from an aqueous medium containing ferric ion and dissolved phosphate values as contaminates.

It is still a further object to provide a novel process for leaching ores containing uranium and vanadium values in which the vanadium values are recovered from the leach liquor subsequent to the recovery of the uranium values and both pentavalent vanadium and ferric iron values may be recycled back to the leaching step as an oxidant for the uranium.

Still other objects and advantages of the invention will be apparent to those skilled in the art upon reference to the following detailed description and the examples.

It has been discovered that vanadium values may be readily recovered as a high purity commercial vanadium product from an aqueous medium contaminated with large amounts of phosphate, such as from a raffinate resulting from the solvent extraction of uranium values from a uranium-vanadium ore leach liquor. This may be accomplished economically and even though not more than 0.5 gram of vanadium values per liter when calculated as $V_2O_5$ are present in solution.

In recovering the vanadium values, the aqueous medium initially should have a pH value less than 2 and should be at a reasonably oxidized level although, if desired, it may be completely oxidized with substantially all of the vanadium values being present in the pentavalent oxidation state. The aqueous medium may be adjusted in pH by addition of base to about 3 to 3.5, and preferably to about 3.25. Under these conditions the solubilized silica and alumina are rejected and substantially all of the vanadium values, ferric iron values and phosphate values are precipitated to yield a low-grade sludge which may contain, for example, 3–5% by weight of vanadium values when calculated as $V_2O_5$. The sludge may be separated from the aqueous medium by filtration.

The resultant low grade sludge requires extensive upgrading before it may be converted into a vanadium product of commerce containing at least 98% vanadium. This may be accomplished by leaching the sludge with aqueous sulfuric acid at a pH of, for example, 0.5–2 and preferably about 1.2 followed by filtering from the insoluble material. The leaching process dissolves all of the vanadium and iron values, and the sludge leach liquor thus produced is much more concentrated in vanadium values. For example, the concentration of vanadium in the original aqueous medium may be only 0.3 gram of $V_2O_5$ per liter, while the concentration in the sludge leach liquor may be 6–10 grams per liter of $V_2O_5$ or higher which is more than a 20-fold concentration. By heating the concentrated sludge leach liquor to the boiling point, it is possible to precipitate the vanadium values in a much purer form and the resultant high grade precipitated product may contain 60–70% by weight of vanadium values when calculated as $V_2O_5$ and about 10–15% iron. The high grade product may be dissolved in sulfuric acid and the solution used in producing a vanadium product of commerce under the usual red cake or hydrous vanadium oxide precipitating conditions.

Only a relatively small amount of phosphate is precipitated from the sludge leach liquor along with the high grade vanadium precipitate and thus phosphate rejection under these conditions is satisfactory. However, unfortunately this degree of purification is achieved at the expense of loss of vanadium values as up to 30% by weight of the vanadium is not precipitated and remains in solution. Therefore, in order for the process to be commercially attractive, it is necessary that the dissolved vanadium be recycled. In instances where a uranium-vanadium ore is being leached, this is also attractive from the standpoint of recovering the oxidant value of the ferric iron and oxidized vanadium values of the sulfuric acid solution. This results in a very significant saving in chemical oxidant costs during a uranium leaching step.

The difficulty encountered with the above mentioned process when used for the recovery of uranium and vanadium values from uranium-vanadium ores is that the phosphate becomes locked into the circuit, and gradually builds up to concentrations which are prohibitive for the economic recovery of the vanadium values as a product of commerce. The ore contributes steady amounts of phosphate and as it is not extracted with the uranium values, substantially all of the phosphate values are precipitated along with the vanadium values upon adjusting the pH of the uranium raffinate liquor to about 3–3.5. Also, when the low grade sludge is leached with sulfuric acid to upgrade it, the phosphate values are redissolved but not reprecipitated in substantial amounts when the sludge leach liquor is boiled to precipitate the high grade vanadium precipitate. Accordingly, the phosphate accumulates in the circuit upon recycle and the concentration rises throughout the system to intolerable levels.

In view of the above, when recycling the sludge leach liquor it is necessary to reduce the phosphate concentration at some step in the over-all process. This should be done without incurring substantial losses of vanadium or oxidant values and therefore presents a very complicated problem from the standpoint of operating variables. The problem is magnified many fold by the fact that the phosphate and vanadium values resemble each other in their precipitation characteristics, so that under prior art precipitating conditions vanadium and phosphate are travelling companions.

It is known from qualitative inorganic analysis that phosphate may be removed from the Group III metals by precipitating with a large excess of ferric ion at a pH of about 3.5 in acetate buffered solution. One would also expect that high levels of ferric ion would be beneficial in precipitating phosphate values from the vanadium-containing solutions of the present invention at a pH value of 2–3 and preferably about 2.5–2.8, which are the most satisfactory pH levels for eliminating phosphate. However, this has been found not to be true.

It has been discovered unexpectedly and contrary to what would be expected by one skilled in the art, that for some reason excess ferric ion over that amount required for precipitation of the phosphorus values as ferric phosphate inhibits phosphate precipitation at a pH value between 2 and 3. While the reason for this is not fully understood at the present time, it has been discovered nevertheless that an aqueous medium such as uranium raffinate should contain about that quantity of ferric ion required to react stoichiometrically with the phosphate values to produce ferric phosphate. Therefore, the gram atomic weight ratio of iron to phosphorus in the ferric ion and phosphorus values present in the solution should be between 0.75:1 and 1.5:1 and preferably between 0.8:1 and 1.2:1. Best results are usually achieved when the ratio is about 1:1.

The uranium raffinates usually have a pH value less than 2 and preferably 1.2, an EMF of about −400 millivolts, as measured with platinum vs. calomel electrodes at 25° C., and contain about 0.25–0.3 gram per liter of vanadium values when calculated as vanadium pentoxide, a total of about 2–3 grams of iron values which is often present in about equal amounts of ferrous and ferric ion, 6–10 grams of aluminum values when calculated as aluminum oxide, about 1 gram of silica values when calculated as silicon dioxide, and only about 0.2–0.25 gram of phosphate values when calculated as phosphorus pentoxide. The gram atomic weight ratio of dissolved iron to phosphorus is greater than about 1.75:1 and it is therefore apparent that the ferric ion is present in great excess over the quantity stoichiometrically required to precipitate the phosphate values as ferric phosphate. The higher the negative electromotive force (EMF) of a raffinate, as measured using a platinum vs. saturated calomel electrode at a temperature of 25° C., the greater the ferric ion concentration over ferrous ion that it contains. In instances where a raffinate having a pH value less than 2 contains significantly high quantities of ferric ion and has an EMF of −440 millivolts (mv.), pH adjustment to 2.75 results in no phosphate depletion over a two-hour period. When the ferric ion content of the raffinate is reduced until the EMF is, for example, about −360 mv. and the pH is adjusted to 2.75, then the residual phosphate concentration falls very markedly due to formation of a precipitate.

A wide variety of reducing agents may be employed in reducing ferric ion to ferous ion. However, it is usually preferred that the ferric ion be reduced by addition to the aqueous medium of a water soluble substance providing sulfite ion in aqueous solution. Examples of such water soluble substances include ammonium, sodium, and potassium sulfites, sulfurous acid, and sulfur dioxide. Still other water soluble substances providing sulfite ion may be added.

In instances where sulfur dioxide is added to the aqueous medium as a reducing agent, it is preferably added in the presence of activated charcoal. A small or catalytic amount of a catalyst also may be present, such as a water soluble thiocyanate which provides thiocyanate ion in solution. Examples of suitable catalysts include ammonium, sodium and potassium thiocyanates although other water soluble thiocyanates may be employed. In most instances, a concurrent reduction process is preferred when sulfur dioxide is the reducing agent. In practicing the concurrent process, the solution containing the ferric ion to be reduced may be passed through a bed of activated carbon concurrently with a stream of sulfur dioxide. This process results in extremely rapid and effective reduction of ferric ion to ferrous ion and also the reduction may be controlled within very narrow EMF limits or ferric ion concentration.

The pH value of the aqueous medium may be adjusted to a higher level by addition of any suitable basic substance thereto which is not deleterious to the over-all process. Examples of suitable substances which may be used include ammonia, ammonium hydroxide, carbonate and bicarbonate, and alkali metal and alkaline earth metal oxides, hydroxides, carbonates and bicarbonates. Usually, limestone is preferred as it is readily available in most localities and very low in cost. One or more of the above substances may be added if desired when increasing the pH value of the aqueous medium for the purpose of precipitating the phosphorus values, or precipitating the vanadium values.

A wide variety of oxidizing agents may be added to the aqueous medium as an oxidant for the tetravalent vanadium values and ferrous ion. Examples of suitable chemical oxidants include sodium or potassium chlorate but other known chemical oxidants may be used. The process of the invention lends itself especially well to the microbiological oxidation of the tetravalent vanadium values to pentavalent vanadium values and ferrous ion to ferric ion. Microbiological oxidation is usually preferred for economic reasons.

The bacteria useful in practicing the microbiological oxidation step are non-spore forming, rod-shaped, motile, autotrophic oxidizing bacteria which have the ability to oxidize ferrous ion to ferric ion and tetravalent vanadium values to pentavalent vanadium values. Usually, the bacteria are approximately 0.5 to 1.0 millimicron in width and 1 to 2 millimicrons in length, and they derive their energy from the oxidation of ferrous ion or the oxidation of vanadium in valence states less than plus 5, and perhaps to some extent by the oxidation of other substances which may be present such as sulfur. They are capable of using carbon dioxide as a source of carbon and organic materials are not essential for growth. They require an acidic aqueous medium for growth having a pH value of, for example, 0.8–3, and preferably about 1.1–2.8. The temperature of the aqueous medium may vary over wide ranges such as 0–50° C., but better results are obtained at 15–40° C. and optimum results usually at about 35° C.

In their naturally occurring state, the bacteria seem to be substantially identical with *Ferribacillus ferrooxidans*, *Thiobacillus ferrooxidans*, or oxidizing bacteria found in copper and iron-containing mine waters in the Brainard Lake and Idaho Springs areas of Colorado. The bacteria in their naturally occurring state do not appear to exhibit a tolerance of any substantial degree to appreciable concentrations of uranium or vanadium values.

The American Type Culture Collection, 2112 M St. NW., Washington 7, D.C., has given Collection Catalog No. 13661 to a strain of *Ferrobacillus ferrooxidans* and Catalog No. 13598 to a strain of *Thiobacillus ferrooxidans* which may be used in developing a preferred strain of bacteria. However, all of these strains must be artificially grown under conditions described herein to obtain a strain which exhibits a satisfactory tolerance to vanadium or uranium.

In obtaining a preferred strain for use in practicing the invention, the bacteria are artificially grown over many generations to the appropriate tolerance for vanadium values, and also uranium values when present. This may be accomplished by growing a culture of the bacteria in a medium containing vanadium values which is synthetic in nature and tolerated by the bacteria initially. By gradually building up the concentration of the vanadium values, and if desired other substances which may be present in the aqueous medium to be oxidized, it is possible to obtain a strain of bacteria which is satisfactory for practicing the present invention. Soluble compounds of vanadium and/or uranium may be added to the culture medium in small amounts gradually over a period of many weeks until the bacteria have the desired degree of tolerance. The bacteria readily develop a tolerance to substantial levels of vanadium values, such as the 0.5 gram per liter when calculated as $V_2O_5$ which usually exists in raffinate liquors obtained in processing uranium-vanadium ore leach liquors by solvent extraction techniques.

In oxidizing the tetravalent vanadium values and ferrous iron values with the above described strain of bacteria, the aqueous medium is inoculated with the bacteria and maintained at a pH of about 0.8–3.5 and a temperature of about 0–50° C. The bacteria multiply rapidly and especially if nutrients are added. Alkali metal nitrates or ammonium mineral acid salts may be added in quantities to provide 1–200 parts per million of nitrogen and trace amounts of metals such as cobalt, magnesium and manganese also may be added. Most leach liquors contain phosphorus, potassium and other substances necessary for growth of the bacteria and need not be added. The oxidation rate may be increased markedly by passing an elemental oxygen-containing gas such as air into the leach liquor as the oxidation proceeds. The oxidation rate may be further improved by providing a satisfactory support for the multiplying and growing microorganisms such as volcanic rock and inert materials in general which provide an extended surface area. The oxidation is allowed to proceed until the ferrous ion and tetravalent vanadium values are oxidized to ferric ion and pentavalent vanadium values, respectively.

The foregoing detailed description and the following specific examples are for purposes of illustration only, and are not intended as being limiting to the spirit or scope of the appended claims.

EXAMPLE I

A leach liquor is prepared by prior art sulfuric acid leaching of a bed of uranium ore of the Ambrosia Lake type. The leach liquor contains solubilized uranium and vanadium values and also ferrous ion, ferric ion, phosphorus values, aluminum values and silica. The leach liquor is solvent extracted with a prior art amine solvent extractant for the uranium values to thereby recover the uranium values in the solvent extractant phase and produce a uranium-barren aqueous raffinate having a pH value of 1.2 and an EMF of −400 millivolts which contains only traces of uranium values, 0.3 g./l. of tetravalent vanadium values when calculated as $V_2O_5$, 1 g./l. of ferric ion when calculated as Fe, 1 g./l. of ferrous ion when calculated as Fe, 0.3 g./l. of phosphorus values when calculated as $P_2O_5$, 8 g./l. of aluminum values when calculated as $Al_2O_3$, and 1 g./l. of dissolved or colloidally dispersed silica when calculated as $SiO_2$. The uranium values are stripped from the loaded solvent extractant and the regenerated solvent extractant is recycled in the extraction circuit.

About 70% by volume of the raffinate is reduced until the EMF is −345 millivolts by passing it through a bed of activated charcoal in concurrent relation to a stream of sulfur dioxide. The gram atomic weight ratio of ferric iron to phosphorus in the iron and phosphorus values of the reduced raffinate is approximately 1:1.

Limestone is added to the reduced raffinate to increase the pH value to 2.75 and precipitate the contaminating phosphorus values. The tetravalent vanadium values remain in solution. The raffinate is then passed to a thickener where the precipitated phosphorus values are separated and discarded as the underflow. The overflow containing the vanadium values and most of the iron values is mixed with the remaining 30% by volume of unreduced raffinate, a small amount of ammonium sulfate is added, and the resulting raffinate is subjected to microbial oxidation at a temperature of about 30° C.

The bacteria used in this example is a strain artificially bred to tolerate the presence of vanadium and uranium values and the other constituents of the raffinate. The strain is developed from naturally occurring oxidizing bacteria obtained from copper and iron containing mine waters found in the Brainard Lake area and the Idaho Springs area of Colorado. The bacteria used in this example are non-spore forming, rod shaped, motile, autotrophic, oxidizing bacteria. They appear to be identical with bacteria usually identified as *Thiobacillus ferrooxidans* or *Ferrobacillus ferrooxidans* with the exception of having the ability to grow and thrive in the raffinate and the ability to oxidize the ferrous ion and tetravalent vanadium values contained therein to ferric ion and plus 5 vanadium values, respectively, in a practical period of time. The original bacteria are unable to thrive and multiply rapidly in the raffinate. However, after growing successive generations of the bacteria in acidic aqueous media containing lower concentrations of the various constituents of the raffinate, followed by gradually increasing the concentrations of the constituents over a long period of time, it is possible to arrive at a strain which is capable of rapidly oxidizing both iron and vanadium values.

A vat s partially filled with volcanic rock and then charged with the raffinate. Then, the strain of bacteria identified above is charged to the vat. The raffinate is aerated vigorously and the electromotive force (EMF) recorded periodically. The negative EMF gradually rises and when it reaches approximately —500 to —550 millivolts, substantially no ferrous ion is present in the solution. Thus the ferrous ion has been substantially completely oxidized to ferric ion. At this time, very little if any vanadium is oxidized from the plus 4 to the plus 5 oxidation state. The oxidation is allowed to continue until the EMF reaches —600 millivolts. At that time, substantially all of the vanadium values are in the plus 5 or pentavalent oxidation state.

Limestone is added to the oxidized raffinate to increase the pH value to 3.25 and precipitate a low grade sludge containing about 3–5% by weight of vanadium values when calculated as $V_2O_5$. The raffinate is passed to a thickener and the sludge is separated as the underflow and filtered to remove additional raffinate. The overflow and filtrate contain a large amount of the contaminating aluminum and silica values but only a small amount of the vanadium values are lost.

The sludge is leached with sulfuric acid and the insoluble residue removed by filtration to produce a leach liquor having a pH value of 1.2 and containing the ferric iron and pentavalent vanadium values in solution; however, the relative amounts of phosphorus, aluminum and silica contaminants present in the original raffinate have been greatly reduced. The leach liquor is heated to the boiling point to precipitate a high grade vanadium product containing about 70% by weight of vanadium values when calculated as $V_2O_5$.

The vanadium product is separated from the leach liquor by filtration, dissolved in strong aqueous sulfuric acid having a pH value of almost zero and the solution is oxidized with sodium chlorate to assure that substantially all of the vanadium values are in the pentavalent oxidation state. Then, the solution is neutralized to a pH value of about 1 or somewhat higher by addition of caustic and heated to precipitate a high purity vanadium oxide product of commerce which is recovered by filtration and dried.

The low grade sludge leach liquor filtrate contains about 25% by weight of the pentavalent vanadium values and most of the ferric ion originally present therein. Thus, sulfuric acid is added to the sludge leach liquor and it is recycled back to the uranium ore leaching step to recover the oxidant value and vanadium content in order for the process to be economical.

The above over-all process could be practiced indefinitely to produce specification grade uranium and vanadium products as the undesirable contamination do not build up in the circuits. Thus, the process is highly efficient and uranium and vanadium products are produced at the lowest possible cost.

EXAMPLE II

The raffinate used in this example is produced in accordance with Example I. The raffinate as produced contained 0.398 g./l. of vanadium values when calculated as $V_2O_5$ 0.348 g./l. of vanadium values when calculated as $P_2O_5$, 1 g./l. of ferrous ion when calculated as Fe, and 1 g./l. of ferric ion when calculated as Fe.

A portion of the raffinate was oxidized with sodium chlorate until substantially all of the iron and vanadium values were in the ferric and pentavalent valence states, respectively. The oxidized raffinate contained 0.218 g./l. of vanadium values when calculated as $V_2O_5$, 0.30 g./l. of phosphorus values when calculated as $P_2O_5$, and 2 g./l. of ferric ion when calculated as Fe.

Mixtures of the oxidized raffinate and the raffinate as produced were prepared containing 25, 50 and 75% by volume of the oxidized raffinate. Aliquots of each of these mixtures and of the oxidized raffinate were adjusted to pH values of 2.5, 2.6 and 2.7 by addition of limestone and examined for precipitation of ferric phosphate. The aliquots were allowed to stand after adjustment in pH for a period of two hours which is much longer than normally required for ferric phosphate precipitation, then filtered and the filtrate analyzed for vanadium and phosphorus values. The data are recorded below.

| pH of aliquot | Percent by volume of oxidized raffinate in aliquot | | | |
|---|---|---|---|---|
| | 100 | 75 | 50 | 25 |
| 2.5 | 0.218 g./l. $V_2O_5$. | 0.35 g./l. $V_2O_5$. | 0.38 g./l. $V_2O_5$. | 0.38 g./l. $V_2O_5$. |
| | 0.302 g./l. $P_2O_5$. | 0.34 g./l. $P_2O_5$. | 0.35 g./l. $P_2O_5$. | 0.35 g./l. $P_2O_5$. |
| 2.6 | 0.215 g./l. $V_2O_5$. | 0.31 g./l. $V_2O_5$. | 0.38 g./l. $V_2O_5$. | 0.38 g./l. $V_2O_5$. |
| | 0.302 g./l. $P_2O_5$. | 0.30 g./l. $P_2O_5$. | 0.32 g./l. $P_2O_5$. | 0.33 g./l. $P_2O_5$. |
| 2.7 | 0.220 g./l. $V_2O_5$. | 0.23 g./l. $V_2O_5$. | 0.35 g./l. $V_2O_5$. | 0.38 g./l. $V_2O_5$. |
| | 0.29 g./l. $P_2O_5$. | 0.26 g./l. $P_2O_5$. | 0.32 g./l. $P_2O_5$. | 0.34 g./l. $P_2O_5$. |

It is evident from the above data that an excess of ferric ion is not helpful in the precipitation of phosphate values as ferric phosphate. In the aliquot containing all oxidized raffinate, a very large excess of ferric ion over phosphate was present; however, substantially no phosphate values were precipitated.

Efforts to seed the aliquots with freshly prepared ferric phosphate did not result in the precipitation of additional ferric phosphate. Thus, the aliquots were not supersaturated with respect to ferric phosphate.

EXAMPLE III

The raffinate used in this example is produced in accordance with Example I. The raffinate as produced contained 0.36 g./l. of phosphorus values, when calculated as $P_2O_5$, 0.8 g./l. of ferrous ion when calculated as Fe, and 1.36 g./l. of ferric ion when calculated as Fe. The EMF was —440 millivolts and the pH value was 1.2.

Aliquots of the raffinate were reduced to EMF values varying between —420 millivolts and —320 millivolts by passing through a bed of activated charcoal concurrently with a stream of sulfur dioxide. The reduced aliquots and one control aliquot were neutralized to a pH value of 2.75 by addition of limestone, held for two hours and filtered. The reduced aliquots were assayed for residual phosphorus values, and for ferric ion both before and after neutralization and the data recorded in grams/liter. The data are recorded below.

| Sample No. | EMF, millivolts | Assays, g./l. | | | |
|---|---|---|---|---|---|
| | | Before Neutralization | | After Neutralization | |
| | | $P_0O_5$ | $Fe^{+3}$ | $P_0O_5$ | $Fe^{+3}$ |
| 1 | [1]—440 | 0.36 | 1.36 | 0.33 | 1.4 |
| 2 | —420 | 0.36 | 1.01 | 0.29 | 1 1 |
| 3 | —400 | 0.36 | 0.80 | 0.21 | 1.0 |
| 4 | —380 | 0.36 | 0.28 | 0.19 | |
| 5 | —360 | 0.36 | 0.24 | 0.09 | 0.16 |
| 6 | —340 | 0.36 | 0.18 | 0.17 | 0.10 |
| 7 | —320 | 0.36 | 0.10 | 0.26 | |

[1] Control.

It is evident from the above data that an excess or an insufficiency of ferric ion over the quantity required to precipitate the phosphorus values as ferric phosphate adversely affects the precipitation. The best results are obtained when approximately equal gram atomic weights of ferric ion and phosphorus are present.

What is claimed is:
1. A process for precipitating dissolved phosphorus values from an acidic aqueous medium containing ferric ion in solution, the aqueous medium having a pH value less than 2 and the gram atomic weight ratio of iron to phosphorus in the ferric ion and phosphorus values dissolved therein being greater than about 1.75:1, comprising the steps of reducing ferric ion to ferrous ion to provide a gram atomic weight ratio of dissolved ferric iron to dissolved phosphorus between 0.75:1 and 1.5:1, increasing the pH value of the aqueous medium to between 2 and 3 by addition of a base thereto in an amount to precipitate dissolved phosphorus values, and separating the precipitated phosphorus values from the aqueous medium.

2. The process of claim 1 wherein ferric ion is reduced to ferrous ion to provide a gram atomic weight ratio of ferric iron to phosphorus between 0.8:1 and 1.2:1.

3. The process of claim 2 wherein the pH value of the aqueous medium is increased to 2.5–2.8 by addition of the base.

4. The process of claim 1 wherein the ferric ion is reduced by addition to the aqueous medium of a water soluble substance providing sulfite ion in aqueous solution.

5. The process of claim 1 wherein the pH value of the aqueous medium in increased by addition of at least one substance selected from the group consisting of ammonia, ammonium hydroxide, carbonate and bicarbonate, and alkali metal and alkaline earth metal oxides, hydroxides, carbonates and bicarbonates.

6. The process of claim 1 wherein the ferric ion is reduced to ferrous ion by addition to the aqueous medium of a water soluble substance providing sulfite ion in aqueous solution, the ferric ion is reduced to ferrous ion to provide a gram atomic weight ratio of ferric iron to phosphorus between 0.8:1 and 1.2:1, and the pH value of the aqueous medium is increased to 2.5–2.8 by addition of at least one substance selected from the group consisting of ammonia, ammonium hydroxide, carbonate and bicarbonate, and alkali metal and alkaline earth metal oxides, hydroxides, carbonates and bicarbonates.

7. The process of claim 6 wherein ferric ion is reduced to ferrous ion by addition of sulfur dioxide to the aqueous medium, and the pH value of the aqueous medium is increased by addition of limestone to the aqueous medium.

8. A process for recovering vanadium values from an acidic aqueous medium containing ferric ion, phosphorus values and vanadium values in solution, the aqueous medium having a pH value less than 2 and the gram atomic weight ratio of iron to phosphorus in the ferric ion and phosphorus values dissolved therein being greater than about 1.75:1, comprising the steps of reducing ferric ion to ferrous ion to provide a gram atomic weight ratio of dissolved ferric iron to dissolved phosphorus between 0.75:1 and 1.5:1, increasing the pH value of the aqueous medium to between 2 and 3 by addition of a base thereto in an amount to precipitate dissolved phosphorus values, separating the precipitated phosphorus values from the aqueous medium, and increasing the pH value of the aqueous medium to a value greater than 3 by addition of a base thereto in an amount to precipitate dissolved vanadium values, at least a portion of the vanadium values being in the pentavalent oxidation state at the time of precipitation from the aqueous medium.

9. The process of claim 8 wherein the ferric ion is reduced to ferrous ion by addition to the aqueous medium of a water soluble substance providing sulfite ion in aqueous solution, the ferric ion is reduced to ferrous ion to provide a gram atomic weight ratio of ferric iron to phosphorus between 0.8:1 and 1.2:1, and the pH value of the aqueous medium is increased to 2.5–2.8 by addition of at least one substance selected from the group consisting of ammonia, ammonium hydroxide, carbonate and bicarbonate, and alkali metal and alkaline earth metal oxides, hydroxides, carbonates and bicarbonates.

10. The process of claim 9 wherein ferric ion is reduced to ferrous ion by addition of sulfur dioxide to the aqueous medium, and the pH value of the aqueous medium is increased by addition of limestone to the aqueous medium.

11. A process for recovering uranium and vanadium values from a uranium-vanadium ore containing phosphorus values comprising leaching the ore with aqueous sulfuric acid, at least a portion of the uranium values being in the quadrivalent state and the aqueous sulfuric acid initially containing ferric ion in solution as an oxidant for the quadrivalent uranium values, the resulting leach liquor containing ferric ion, uranium values and phosphorus values in solution, recovering uranium values from the leach liquor by intimately contacting it with an organic solvent extractant and separating the uranium-loaded solvent extractant from the raffinate, the raffinate having a gram atomic weight ratio of iron to phosphorus greater than about 1.75:1 in the ferric ion and phosphorus values dissolved therein, reducing ferric ion to ferrous ion in at least a portion of the raffinate to provide a gram atomic weight ratio of dissolved ferric iron to dissolved phosphorus between 0.75:1 and 1.5:1, and increasing the pH value thereof to between 2 and 3 by addition of a base in an amount to precipitate dissolved phosphorus values, separating the precipitated phosphorus values from the raffinate, the raffinate containing quadrivalent vanadium values, oxidizing quadrivalent vanadium values to the petavalent oxidation state in at least a portion of the raffinate, the raffinate also containing ferrous ion which is oxidized to ferric ion during oxidation of the quadrivalent vanadium values, increasing the pH of the raffinate to a value greater than 3 by addition of a base thereto in an amount to precipitate vanadium values, at least a portion of the vanadium values being in the pentavalent oxidation state at the time of precipitation from the aqueous medium and ferric iron values also being precipitated therewith, separating the precipitated pentavalent vanadium and ferric iron values from the raffinate, dissolving the separated precipitate in aqueous sulfuric acid to produce a solution containing pentavalent vanadium values and ferric ion, heating the aqueous sulfuric acid solution of pentavalent vanadium values and ferric ion to an elevated temperature to produce a second precipitate containing vanadium values, separating the second precipitate from the aqueous sulfuric acid containing dissolved ferric ion and vanadium values, and passing the separated aqueous sulfuric acid solution and the ferric ion and residual vanadium values present therein to the uranium-vanadium ore leaching step and solubilizing additional uranium and vanadium values.

12. The process of claim 11 wherein the ferric ion is reduced to ferrous ion to provide a gram atomic weight ratio of ferric iron to phosphorus between 0.8:1 and 1.2:1.

13. The process of claim 11 wherein the pH value of the raffinate is increased to 2.5–2.8 by addition of the base to precipitate phosphorus values, and the pH value of the raffinate is increased to 3–3.5 by addition of the base to precipitate the vanadium and ferric iron values.

14. The process of claim 11 wherein the ferric ion is reduced to ferrous ion by addition to the raffinate of a water soluble substance providing sulfite ion in aqueous solution.

15. The process of claim 11 wherein the ferric ion is reduced to ferrous ion by addition to the raffinate of a water soluble substance providing sulfite ion in aqueous solution, the ferric ion is reduced to ferrous ion to provide a gram atomic weight ratio of ferric iron to phosphorus between 8.8:1 and 1.2:1, and the pH value of the raffinate is increased in each instance by addition of at least one substance selected from the group consisting of ammonia, ammonium hydroxide, carbonate and bicarbonate, and alkali metal and alkaline earth metal oxides, hydroxides, carbonates and bicarbonates.

16. The process of claim 15 wherein ferric ion is reduced to ferrous ion by addition of sulfur dioxide to the raffinate, and the pH value of the raffinate is increased by addition of limestone.

17. The process of claim 16 wherein the ferric ion is reduced to ferrous ion to provide a gram atomic weight ratio of ferric iron to phosphorus of about 1:1.

References Cited

UNITED STATES PATENTS

| | | | |
|---|---|---|---|
| 1,812,761 | 1/1931 | Stevens et al. | 23—19.1 |
| 2,770,522 | 11/1956 | Bailes et al. | 23—19 |
| 2,959,462 | 11/1960 | Roren | 23—23 |

CARL D. QUARFORTH, *Primary Examiner.*

M. J. McGREAL, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,026                                September 17, 1968

Mayer B. Goren

It is certified that error appears in the above identified patent and that said Letters Patent are hereby corrected as shown below:

Column 7, line 8, "s" should read -- is --. Column 10, line 33, "petavalent" should read -- pentavalent --; line 73, "8.8:1" should read -- 0.8:1 --.

Signed and sealed this 3rd day of February 1970.

(SEAL)
Attest:

Edward M. Fletcher, Jr.
Attesting Officer

WILLIAM E. SCHUYLER, JR.
Commissioner of Patents